United States Patent
Su et al.

(10) Patent No.: US 11,909,108 B2
(45) Date of Patent: Feb. 20, 2024

(54) SWITCH CIRCUIT, CONTROL METHOD, CONTROL DEVICE, RADIO FREQUENCY SWITCH AND READABLE STORAGE MEDIUM

(71) Applicant: SMARTER MICROELECTRONICS (GUANG ZHOU) CO., LTD., Guangzhou (CN)

(72) Inventors: Qiang Su, Guangzhou (CN); Jiangtao Yi, Guangzhou (CN); Guoguo Yan, Guangzhou (CN)

(73) Assignee: SMARTER MICROELECTRONICS (GUANG ZHOU) CO., LTD., Guangzhou (CN)

( * ) Notice: Subject to any disclaimer, the term of this patent is extended or adjusted under 35 U.S.C. 154(b) by 454 days.

(21) Appl. No.: 17/139,468

(22) Filed: Dec. 31, 2020

(65) Prior Publication Data

US 2021/0210847 A1    Jul. 8, 2021

Related U.S. Application Data

(63) Continuation of application No. PCT/CN2020/117501, filed on Sep. 24, 2020.

(30) Foreign Application Priority Data

Jan. 3, 2020 (CN) .......................... 202010006059.7

(51) Int. Cl.
*H01Q 1/50* (2006.01)
*H01Q 1/52* (2006.01)
*H01Q 1/48* (2006.01)

(52) U.S. Cl.
CPC ................ *H01Q 1/52* (2013.01); *H01Q 1/48* (2013.01); *H01Q 1/50* (2013.01)

(58) Field of Classification Search
CPC .. H04B 1/44–48; H03H 7/38–40; H03H 9/70; H01Q 1/243; H01Q 1/50–52
See application file for complete search history.

(56) References Cited

U.S. PATENT DOCUMENTS

2004/0264095 A1* 12/2004 Block ...................... H01Q 1/50
361/119
2017/0331458 A1* 11/2017 Tomita .................. H03H 9/0009
2020/0235760 A1* 7/2020 Nakajima ................ H03H 7/38

* cited by examiner

*Primary Examiner* — Hasan Islam
(74) *Attorney, Agent, or Firm* — Syncoda LLC; Feng Ma

(57) ABSTRACT

A switch circuit includes an antenna port and at least one switch branch. Each branch includes a first, a second, and a third switches. The antenna port has one end connected with an antenna, and another end electrically connected with one end of the first switch of each branch respectively. The other end of the first switch of each branch is electrically connected with one end of the second switch corresponding to each branch and one end of the third switch corresponding to each branch respectively; the other end of each of the second switch corresponding to each branch is connected with a ground terminal; the other end of each of the third switch corresponding to each branch is electrically connected with one end of a load corresponding to each branch; and the other end of the load corresponding to each branch is connected with the ground terminal.

7 Claims, 4 Drawing Sheets

SWITCH CIRCUIT, CONTROL METHOD, CONTROL DEVICE, RADIO FREQUENCY SWITCH AND READABLE STORAGE MEDIUM

CROSS-REFERENCE TO RELATED APPLICATIONS

This application is a continuation of International Application No. PCT/CN2020/117501 filed on Sep. 24, 2020, which claims priority to Chinese Patent Application No. 202010006059.7 filed on Jan. 3, 2020. The disclosures of these applications are hereby incorporated by reference in their entirety.

BACKGROUND

Radio frequency switch is an important component between an antenna and radio frequency front-end, which is configured to switch the operating state of the antenna. With the development of technologies, modern wireless communication devices integrate a number of wireless communication services, and in order to improve the sensitivity of various types of wireless communication services and to avoid mutual interference between different types of wireless communication services, multiple antennas are usually arranged in wireless communication device(s).

SUMMARY

The present disclosure relates generally to wireless communication technologies, and more specifically to a switch circuit, a control method, a control device, a radio frequency switch and a readable storage medium.

According to a first aspect, an embodiment of the disclosure provides a switch circuit, including:

an antenna port and at least one switch branch; herein each of the at least one switch branch includes a first switch, a second switch and a third switch; one end of the antenna port is connected with an antenna; the other end of the antenna port is electrically connected with one end of the first switch of each of the at least one switch branch respectively; the other end of the first switch of each of the at least one switch branch is electrically connected with one end of the second switch corresponding to each of the at least one switch branch and one end of the third switch corresponding to each of the at least one switch branch respectively; the other end of the second switch corresponding to each of the at least one switch branch is connected with a ground terminal; the other end of the third switch corresponding to each of the at least one switch branch is electrically connected with one end of a load corresponding to each of the at least one switch branch; and the other end of the load corresponding to each of the at least one switch branch is connected with the ground terminal.

In an embodiment of the disclosure, a target switch branch of the at least one switch branch is configured to, when the first switch and the third switch corresponding to the target switch branch are closed and the second switch corresponding to the target switch branch is opened, transmit a first radio frequency signal; and the target switch branch is determined, by a wireless communication device, from the at least one switch branch based on the first radio frequency signal;

other switch branches of the at least one switch branch are configured to, when the target switch branch transmits the first radio frequency signal, and the first switches and the third switches corresponding to the other switch branches are opened and the second switches corresponding to the other switch branches are closed, transmit a second radio frequency signal; the other switch branches are switch branches, other than the target switch branch, of the at least one switch branch; and the second radio frequency signal is generated based on the first radio frequency signal transmitted.

In an embodiment of the disclosure, the types of the first switch, the second switch and the third switch may be completely the same, or completely different, or not completely the same.

In an embodiment of the disclosure, the first switch, the second switch and the third switch include multiple electronic switches; and the number of electronic switches included in at least the first switch or the second switch is greater than the number of electronic switches included in the third switch.

According to a second aspect, an embodiment of the disclosure further provides a control method, including:

acquiring a first radio frequency signal; determining, based on the first radio frequency signal, a target switch branch and other switch branches of a switch circuit; and applying a first control signal to the target switch branch and applying a second control signal to the other switch branches; the first control signal is configured to instruct transmission of the first radio frequency signal in the target switch branch; the target switch branch is determined, by a wireless communication device, from multiple switch branches of the switch circuit based on the first radio frequency signal; the second control signal is configured to instruct transmission of a second radio frequency signal in each of the other switch branches; and the second radio frequency signal is generated based on the first radio frequency signal transmitted.

In an embodiment of the disclosure, the first control signal includes a first closing signal and a first opening signal; the second control signal includes a second closing signal and a second opening signal, and correspondingly, the applying the first control signal to the target switch branch and applying the second control signal to the other switch branches, includes:

applying the first closing signal to a first switch and a third switch corresponding to the target switch branch and applying the first opening signal to a second switch corresponding to the target switch branch; the first closing signal is configured to instruct the first switch and the third switch corresponding to the target switch branch to be closed; the first opening signal is configured to instruct the second switch corresponding to the target switch branch to be opened; and applying the second opening signal to a first switch and a third switch corresponding to each of the other switch branches, and applying the second closing signal to a second switch corresponding to each of the other switch branches; the second closing signal is configured to instruct the second switch corresponding to each of the other switch branches to be closed; the second opening signal is configured to instruct the first switch and the third switch corresponding to each of the other switch branches to be opened.

According to a third aspect, an embodiment of the disclosure provides a control device, including an acquiring module, a determining module and an output module, herein:

the acquiring module is configured to acquire a first radio frequency signal;

the determining module is configured to determine, based on the first radio frequency signal, a target switch branch and other switch branches of a switch circuit; and the output module is configured to apply a first control signal to the target switch branch and apply a second control signal to the other switch branches; the first control signal is configured to instruct transmission of the first radio frequency signal in the target switch branch; the target switch branch is determined, by a wireless communication device, from multiple switch branches of the switch circuit based on the first radio frequency signal; the second control signal is configured to instruct transmission of a second radio frequency signal in each of the other switch branches; and the second radio frequency signal is generated based on the first radio frequency signal transmitted.

In an embodiment of the disclosure, the output module is specifically configured as follow: the first control signal includes a first closing signal and a first opening signal; the second control signal includes a second closing signal and a second opening signal, and correspondingly, applying the first control signal to the target switch branch and applying the second control signal to the other switch branches, applying the first closing signal to a first switch and a third switch corresponding to the target switch branch and applying the first opening signal to a second switch corresponding to the target switch branch; the first closing signal is configured to instruct the first switch and the third switch corresponding to the target switch branch to be closed; the first opening signal is configured to instruct the second switch corresponding to the target switch branch to be opened; and applying the second opening signal to a first switch and a third switch corresponding to each of the other switch branches, and applying the second closing signal to a second switch corresponding to each of the other switch branches; the second closing signal is configured to instruct the second switch corresponding to each of the other switch branches to be closed; the second opening signal is configured to instruct the first switch and the third switch corresponding to each of the other switch branches to be opened.

According to a fourth aspect, an embodiment of the disclosure further provides a radio frequency switch, including any one of the above switch circuits.

According to a fifth aspect, an embodiment of the disclosure further provides a readable storage medium, in which a computer program is stored, and the computer program implements, when executed by a processor, the steps of any one of the above methods.

According to a sixth aspect, an embodiment of the disclosure further provides a control device, including: a processor and a memory configured to store a computer program that is executable on the processor, herein, the processor is configured to implement, when executing the computer program, the steps of any one of the above methods.

The embodiments of the disclosure provide a switch circuit, a control method, a control device, a radio frequency switch and a readable storage medium. the switch circuit includes: an antenna port and at least one switch branch; herein each of the at least one switch branch includes a first switch, a second switch and a third switch; one end of the antenna port is connected with an antenna; the other end of the antenna port is electrically connected with one end of the first switch of each of the at least one switch branch respectively; the other end of the first switch of each of the at least one switch branch is electrically connected with one end of the second switch corresponding to each of the at least one switch branch and one end of the third switch corresponding to each of the at least one switch branch respectively; the other end of the second switch corresponding to each of the at least one switch branch is connected with a ground terminal; the other end of the third switch corresponding to each of the at least one switch branch is electrically connected with one end of a load corresponding to each of the at least one switch branch; and the other end of the load corresponding to each of the at least one switch branch is connected with the ground terminal. For the switch circuit provided by the embodiments of the disclosure, by setting the first switch, the second switch and the third switch included in the switch branch, and forming a T-shaped structure by the three switches, the radio frequency switch adopting such switch circuit allows each of the branches inside the switch to be well isolated.

DETAILED DESCRIPTION

In order to make the objectives, technical solutions and advantages of the embodiments of the disclosure clearer, the specific technical solutions disclosed will be further described in detail below with reference to the drawings in the embodiments of the disclosure. The following embodiments are intended to explain the disclosure, but are not intended to limit the scope of the disclosure.

Modern wireless communication device, such as smart phone and tablet PC, etc. integrates various types of wireless communication services with different modes and different frequency bands, such as Global System for Mobile Communications (GSM)/Enhanced Data Rate for GSM Evolution (EDGE), Time Division—Synchronous Code Division Multiple Access (TD-SCDMA)/Wideband Code Division Multiple Access (WCDMA), Frequency Division Dual Long Term Evolution (FDD-LTE)/Time Division Long Term Evolution (TD-LTE), etc. The wireless communication device may also integrate non-cellular wireless communication services such as Wireless Fidelity (WIFI), Global Positioning System (GPS), Bluetooth, FM radio/mobile TV, Radio Frequency Identification (RFID) etc. In this case, a large number of parallel channels are integrated, and in order to improve the sensitivity of wireless communication device to various types of wireless communication services and avoid crosstalk between different types of wireless communication services, the design scheme of setting multiple antennas in the wireless communication device has become a development trend, and under this trend, the radio frequency switch becomes more and more important in the design of radio frequency front-end of the wireless communication device.

At present, a radio frequency switch may be configured in the design of radio frequency front-end, herein, the radio frequency front-end may include a transmitting channel and a receiving channel, and there are many types of radio frequency switches, for example, according to different processes, they may be divided into semiconductor silicon (Si)-type switches and GaAs-type switches, among which the most commonly used radio frequency switches are switches of Silicon-On-Insulation Complementary Metal Oxide Semiconductor (SOI CMOS) among the Si-type switches and GaAs pseudomorphic High Electron Mobility Transistor (pHEMT) switches among the GaAs-type switches; again, for example, according to the types and number of wireless communication services controlled by switches, the radio frequency switches may be divided into single-pole double-throw, single-pole six-throw, three-pole four-throw, three-pole eighteen-throw switches, etc.

Radio frequency switch becomes more and more important in the design of radio frequency front-end of the wireless communication devices. With the development of integration technologies, the distance between branches of the radio frequency switch is greatly shortened, thus leading to great deterioration of isolation between the branches.

Figure 1:
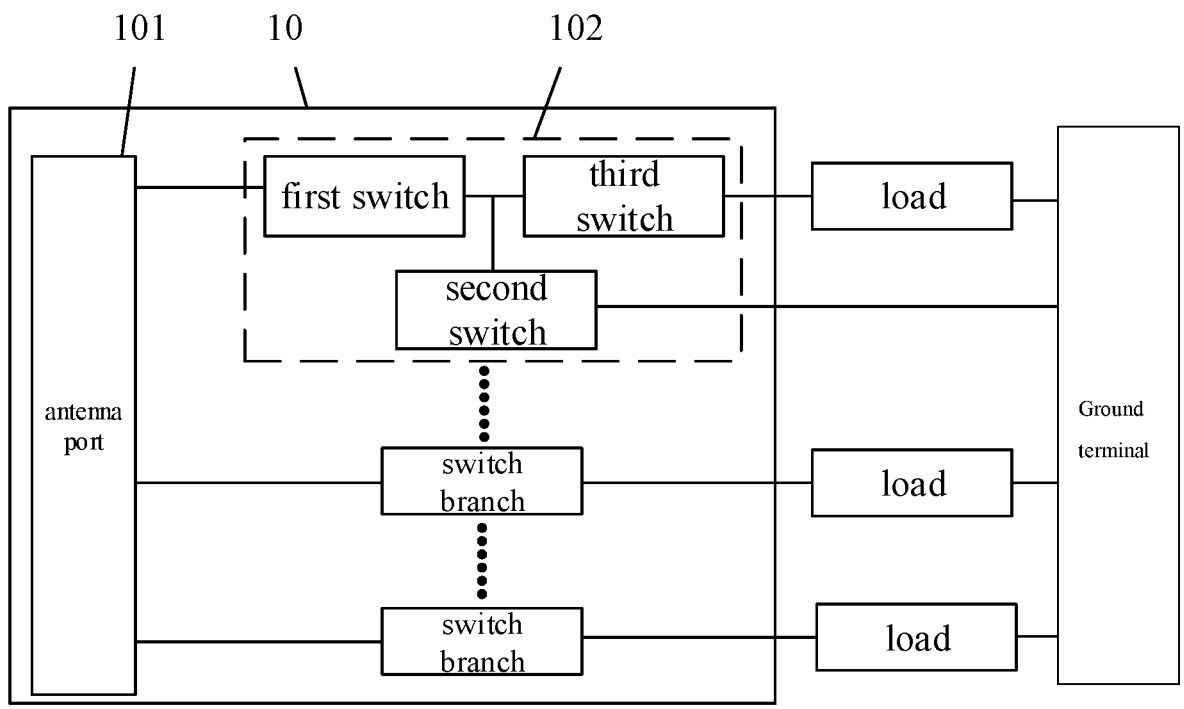
FIG. 1 is a schematic structural diagram of a switch circuit provided by an embodiment of the disclosure.

FIG. 1 is a schematic structural diagram of a switch circuit provided by an embodiment of the disclosure, as illustrated in FIG. 1, the switch circuit 10 includes an antenna port 101 and at least one switch branch 102; herein each of the at least one switch branch 102 includes a first switch, a second switch and a third switch; one end of the antenna port 101 is connected with an antenna; the other end of the antenna port is electrically connected with one end of the first switch corresponding to each of the at least one switch branch 102 respectively; the other end of the first switch of each of the at least one switch branch is electrically connected with one end of the second switch corresponding to each of the at least one switch branch and one end of the third switch corresponding to each of the at least one switch branch respectively; the other end of the second switch corresponding to each of the at least one switch branch is connected with a ground terminal; the other end of the third switch corresponding to each of the at least one switch branch is electrically connected with one end of a load corresponding to each of the at least one switch branch; and the other end of the load corresponding to each of the at least one switch branch is connected with the ground terminal.

It should be noted that the appearance of 'a first radio frequency signal' and 'a second radio frequency signal' here are only configured to describe different signals transmitted in the switch circuit 10, and are not configured to limit the disclosure.

During the practical application, in the switch circuit 10 in FIG. 1, a target switch branch of the at least one switch branch is configured to, when the first switch and the third switch corresponding to the target switch branch are closed and the second switch corresponding to the target switch branch is opened, transmit a first radio frequency signal; and the target switch branch is determined, by a wireless communication device, from the at least one switch branch based on the first radio frequency signal;

other switch branches of the at least one switch branch are configured to, when the target switch branch transmits the first radio frequency signal, and the first switches and the third switches corresponding to the other switch branches are opened and the second switches corresponding to the other switch branches are closed, transmit a second radio frequency signal; the other switch branches are switch branches, other than the target switch branch, of the at least one switch branch; and the second radio frequency signal is generated based on the first radio frequency signal transmitted.

During the practical application, the first radio frequency signal is an electromagnetic wave modulated and with a certain transmitting frequency, and is a radio frequency signal that is desired, by users or operators, to transmit through the switch circuit 10, for example, GSM radio frequency signal, GPS radio frequency signal, Wi-Fi radio frequency signal and etc. The second radio frequency signal is a radio frequency signal that is generated by other switch branches of the at least one switch branch 102 under electromagnetic induction when the first radio frequency signal is transmitted by the target switch branch. The second radio frequency signal is configured to characterize the extent of isolation between the branch port corresponding to the target switch branch and the branch ports corresponding to other switch branches of the at least one switch branch 102, specifically, the second radio frequency signal is negatively correlated with the extent of isolation, that is, the greater the second radio frequency signal in one of the other switch branches is, the lower the extent of isolation between the branch port corresponding to the target switch branch and the branch port corresponding to the one switch branch is; the lower the second radio frequency signal in one of the other switch branches is, the higher the extent of isolation between the branch port corresponding to the target switch branch and the branch port corresponding to the one switch branch is.

In the practical application, the process of determining, by the wireless communication device, the target switch branch may be as follows: a processor of the wireless communication device may determine, based on the first radio frequency signal received or transmitted, a switch branch that needs to transmit the first radio frequency signal, and the switch branch is the target switch branch.

Specifically, the processor may identify the frequency of the first radio frequency signal received or transmitted, acquire an identification result, and determine, based on the identification result, a switch branch, i.e., the target switch branch, that needs to transmit the first radio frequency signal.

Exemplarily, assuming that the switch circuit 10 is a single-pole double-throw switch, that is, the switch circuit 10 includes two switch branches: a first switch branch receives or transmits a first radio frequency signal as a GSM radio frequency signal, with a receiving frequency of 925-960 megahertz (MHZ) and a transmitting frequency of 880-915 MHZ; a second switch branch receives or transmits a first radio frequency signal as a GPS radio frequency signal, with no transmitting frequency and only a receiving frequency of 1575.42+/−10 MHz or 1227.60+/−10 MHz in general, at this time, when the processor of the wireless communication device identifies that the frequency of the received radio frequency signal is between 925 and 960 MHZ, then the processor determines that the switch branch transmitting the first radio frequency signal is the first switch branch, and the first switch branch is the target switch branch.

During the practical application, the processor, upon determining the target switch branch, controls the closing/opening of the switches that are included in the target switch branch, and thus controls whether to transmit the first radio frequency signal in the target switch branch.

Specifically, when the processor of the wireless communication device determines that one of the at least one switch branch 102 is a target switch branch, then the processor controls a first switch and a third switch in the target switch branch to be closed and controls a second switch in the target switch branch to be opened, at this time, a first radio frequency signal may be transmitted between the antenna port 101, the first switch and the third switch in the target switch branch, the load connected with the third switch corresponding to the target switch branch, and the ground terminal. Correspondingly, the switch branches, other than the target switch branch, of the at least one switch branch 102 are other switch branches, and the processor controls a first switch and a third switch corresponding to each of the other switch branches to be opened and controls a second switch corresponding to each of the other switch branches to be closed, in this case, a second radio frequency signal is able to be transmitted between the second switch and the third switch of each of the other switch branches, the corresponding load connected with the third switch of each of the other switch branches, and the ground terminal.

It should be noted that the aforementioned load may be a radio frequency power amplifier of the aforementioned transmitting channel, or a low-noise amplifier, filter, or other components in the receiving channel. In other words, during the practical application, the wireless communication device may receive, through the switch circuit, a radio frequency signal from the antenna, or transmit, through the switch circuit, a radio frequency signal to the antenna.

The specific transmission process of the first radio frequency signal in the target switch branch is illustrated by way of the example that a wireless communication device may receive, through the switch circuit, a radio frequency signal from an antenna.

The specific transmission process may be as follows: the antenna port 101 receives a first radio frequency signal from an antenna, and the processor, upon determining, based on the first radio frequency signal, a target switch branch, controls a first switch and a third switch in the target switch branch to be closed and controls a second switch corresponding to the target switch branch to be opened, so that the first radio frequency signal may be transmitted between the antenna port 101, the first switch and the third switch in the target switch branch, the load connected with the third switch corresponding to the target switch branch, and the ground terminal.

In some embodiments, it should be noted that since the transmission process of a second radio frequency signal in other switch branches is similar, the transmission process of the second radio frequency signal in any of the other switch branches may be illustrated.

Specifically, the transmission process of the second radio frequency signal in one of the other switch branches may be as follows:

When the first radio frequency signal is transmitted in the target switch branch, the processor controls a first switch and a third switch corresponding to one of the other switch branches to be opened and controls a second switch corresponding to one of the other switch branches to be closed, at this time, a second radio frequency signal is generated due to electromagnetic induction in one of the other switch branches, and the second radio frequency signal will be transmitted in a circuit including a second switch and a third switch of the switch branch, the corresponding load connected with the third switch of the switch branch, and the ground terminal. It should be noted that when the third switch corresponding to the switch branch is opened, the impedance of the switch branch is greatly increased, and since the same first radio frequency signal has the same magnitude of induced electromotive force due to electromagnetic induction, then the value of the second radio frequency signal transmitted in the switch branch decreases when the impedance of the switch branch is increased, and it is known from the preceding descriptions that when the value of the second radio frequency signal decreases, the extent of isolation between the target switch branch and the switch branch becomes greater.

During the practical application, the processor of the wireless communication device may, by measuring an interference voltage on the load in the switch branch, determine the extent of isolation between the target switch branch and the switch branch based on the interference voltage. The interference voltage is negatively correlated with the extent of isolation, that is, the greater the interference voltage is, the worse the extent of isolation between the target switch branch and the switch branch is; the lower the interference voltage is, the better the extent of isolation between the target switch branch and the switch branch is.

In some embodiments, the types of the first switch, the second switch and the third switch may be completely the same, or completely different, or not completely the same.

Exemplarily, Si-type switches may be selected for the first switch, the second switch and the third switch, or Si-type switches may be selected for the first switch and second switch, and GaAs-type switches may be selected for the second switch, and so on, and there is no specific limitation on the selection of the types of the three switches.

In the practical application, the size of the third switch is typically smaller than that of the first switch and the second switch in order not to deteriorate the insertion loss excessively, while increasing the extent of isolation between the target switch branch and any of the other switch branches of the at least one switch branch 102.

In some embodiments, the first switch, the second switch and the third switch include multiple electronic switches; and the number of electronic switches included in at least the first switch or the second switch is greater than the number of electronic switches included in the third switch.

It should be noted here that the number of electronic switches included in at least the first switch or the second switch is greater than the number of electronic switches included in the third switch, that is, the size of the third switch is typically smaller than that of the first switch and the second switch. In the practical application, the number of electronic switches included in the third switch may be selected according to the insertion loss, isolation and linearity of the switch circuit 10. The type of the electronic switch may be a SOI CMOS transistor as described above.

Figure 2:
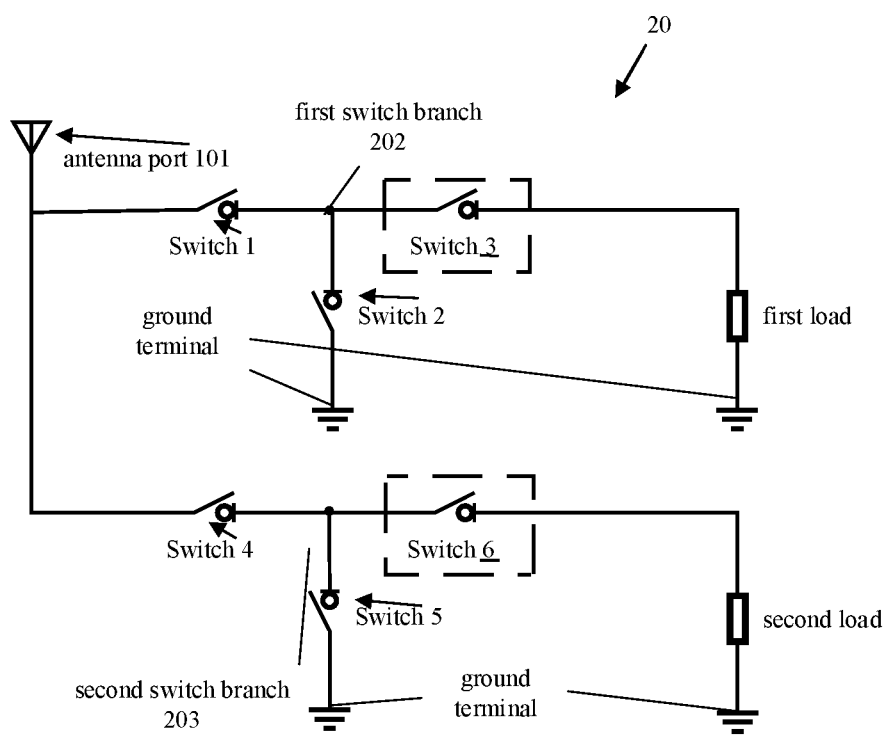
FIG. 2 is a schematic diagram of a topological structure of a single-pole double-throw switch circuit provided by an embodiment of the disclosure.

In order to understand the embodiments of the disclosure, FIG. 2 is a schematic diagram of a topological structure of a single-pole double-throw switch circuit provided by an embodiment of the disclosure, and as illustrated in FIG. 2, the single-pole double-throw radio frequency switch circuit 20 includes an antenna port 101, a first switch branch 202, and a second switch branch 203, herein: the first switch branch 202 includes a switch 1, a switch 2, and a switch 3;

the second switch branch 203 includes a switch 4, a switch 5, and a switch 6; one end of the antenna port 101 is connected with an antenna; the other end of the antenna port 101 is electrically connected with one end of switch 1 of the first switch branch 202 and one end of switch 4 of the second switch branch 203 respectively; the other end of switch 1 of the first switch branch 202 is electrically connected with one end of switch 2 corresponding to the first switch branch 202 and one end of switch 3 corresponding to the first switch branch 202 respectively; switch 3 is electrically connected with a first load; the first load and the other end of switch 2 are connected with a ground terminal; the other end of switch 4 of the second switch branch 203 is electrically connected with one end of switch 5 corresponding to the second switch branch 203 and one end of switch 6 corresponding to the second switch branch 203 respectively; switch 6 is electrically connected with a second load; the second load and the other end of switch 5 are connected with a ground terminal.

In the single-pole double-throw radio frequency switch circuit 20, the wireless communication device, upon acquiring a first radio frequency signal, needs to determine a target switch branch for transmitting the first radio frequency signal, and in the single-pole double-throw radio frequency switch circuit 20, the target switch branch is either the first switch branch or the second switch branch.

Specifically, when the first switch branch is the target switch branch, the processor of the wireless communication device controls switch 1 and switch 3 corresponding to the first switch branch to be closed and controls switch 2 to be opened, at this time, the first radio frequency signal may be transmitted in the first switch branch, specifically, the first radio frequency signal is transmitted between the antenna port 101, switch 1, switch 3, the first load and the ground terminal; correspondingly, the processor of the wireless communication device controls switch 4 and switch 6 corresponding to the second switch branch to be opened and controls switch 5 to be closed, at this time, a second radio frequency signal is transmitted between switch 5 and switch 6 of the second switch branch, the second load and the ground terminal. The second radio frequency signal is generated based on electromagnetic induction during the transmission of the first radio frequency signal.

When the second switch branch is the target switch branch, the processor of the wireless communication device controls switch 4 and switch 6 corresponding to the second switch branch to be closed and controls switch 5 to be opened, at this time, the first radio frequency signal may be transmitted in the second switch branch, specifically, the first radio frequency signal is transmitted between the antenna port 101, switch 4, switch 6, the second load and the ground terminal; correspondingly, the processor of the wireless communication device controls switch 1 and switch 3 corresponding to the first switch branch to be opened and controls switch 2 to be closed, at this time, a second radio frequency signal is transmitted between switch 2 and switch 3 of the first switch branch, the first load and the ground terminal. The second radio frequency signal is generated based on electromagnetic induction during the transmission of the first radio frequency signal.

It should be noted here that the first radio frequency signal and the second radio frequency signal have the same meaning and will not be repeated here. In the practical application, the specific process by which the target switch branch is also determined by the processor of the wireless communication device based on the frequency of the first radio frequency signal received or transmitted is not repeated here.

In the practical application, when the first switch branch is the target switch branch, switch 1, switch 2, and switch 3 are specific implementations of the first switch, the second switch, and the third switch, respectively. When the second switch branch is the target switch branch, switch 4, switch 5, and switch 6 are specific implementations of the first switch, the second switch, and the third switch, respectively. The first load and the second load are also specific implementations of the aforementioned loads.

In some embodiments, the types of switch 1, switch 2 and switch 3 may be completely the same, or completely different, or not completely the same. Similarly, the types of switch 4, switch 5 and switch 6 may be completely the same, or completely different, or not completely the same.

Figure 3:
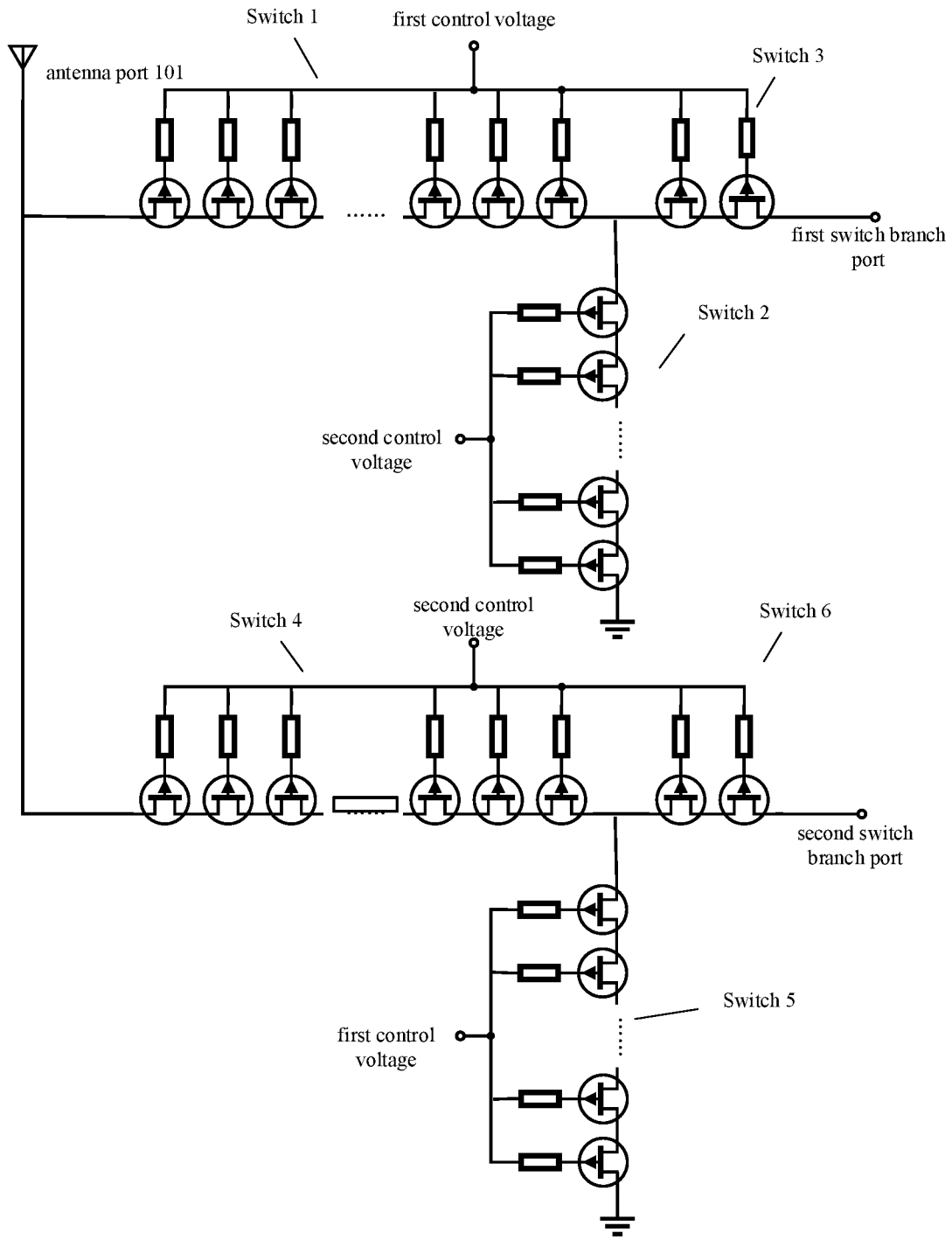
FIG. 3 is a schematic diagram of a hardware structure of a single-pole double-throw switch circuit provided by an embodiment of the disclosure.

In some embodiments, the size of switch 3 is smaller than the size of switch 1 or switch 2; the size of switch 6 is smaller than the size of switch 4 or switch 5, and herein the size may refer to the number of electronic switches included in the switch, that is, the number of electronic switches included in switch 3 is less than the number of electronic switches included in switch 1 or switch 2; similarly, the number of electronic switches included in switch 6 is less than the number of electronic switches included in switch 4 or switch 5, and specific structures may be referred to FIG. 3. In FIG. 3, the radio frequency switch circuit is a single-pole double-throw radio frequency switch circuit, the branch where switch 1, switch 2, and switch 3 are located is the first switch branch; the branch where switch 4, switch 5, and switch 6 are located is the second switch branch, and the number of electronic switches included in switch 3 of the first switch branch is 2; and the number of electronic switches included in switch 1 or switch 2 of the first switch branch is greater than 2, that is, the size of switch 1 or switch 2 is greater than that of switch 3, for this reason, the isolation of the first switch branch and the second switch branch may be improved while not deteriorating the insertion loss excessively. It should be noted that in FIG. 3, the aforementioned switch 1, switch 3, and switch 5 adopt the same type of electronic switch, and switch 4, switch 6, and switch 2 adopt the same type of electronic switch, so that the closing of switch 1, switch 3, and switch 5 may be realized by applying a first control voltage to these switches; the closing of switch 4, switch 6, and switch 2 may be realized by applying a second control voltage to these switches. Here, the first control voltage and the second control voltage are the voltages required to turn the electronic switches on. The first switch branch port is configured to be connected with the aforementioned first load of FIG. 2; the second switch branch port is configured to be connected with the aforementioned second load of FIG. 2.

Figure 4:
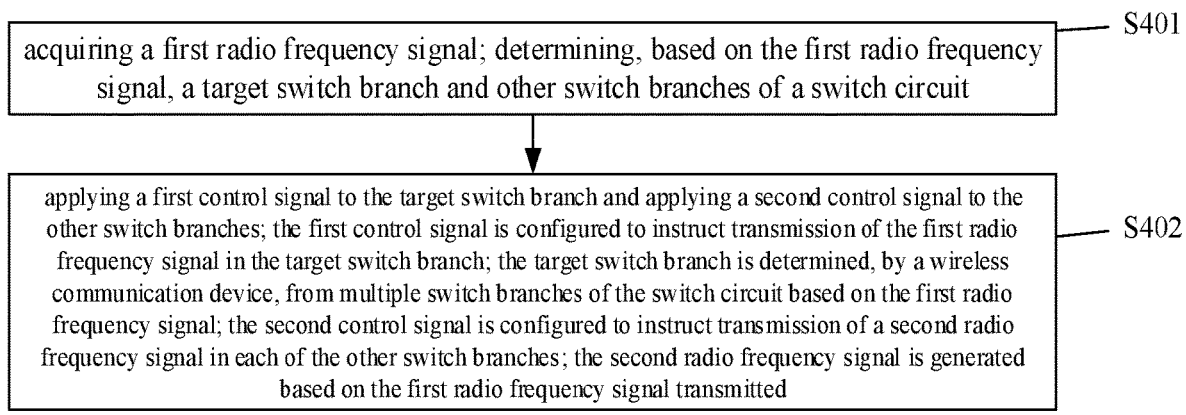
FIG. 4 is a schematic flow diagram of a control method provided by an embodiment of the disclosure.

Based on the same inventive concept, an embodiment of the disclosure further provides a control method, as illustrated in FIG. 4, which illustrates a schematic flow diagram of a control method provided by an embodiment of the disclosure. The control method includes:

In S401: acquiring a first radio frequency signal; determining, based on the first radio frequency signal, a target switch branch and other switch branches of a switch circuit; and In S402: applying a first control signal to the target switch branch and applying a second control signal to the other switch branches; the first control signal is configured to instruct transmission of the first radio frequency signal in the target switch branch; the target switch branch is determined, by a wireless communication device, from multiple switch branches of the switch circuit based on the first radio frequency signal; the second control signal is configured to instruct transmission of a second radio frequency signal in each of the other switch branches; and the second radio frequency signal is generated based on the first radio frequency signal transmitted.

It should be noted here that the first radio frequency signal acquired may be a first radio frequency signal received, by the aforementioned wireless communication device, from the antenna via the aforementioned switch circuit, or a first radio frequency signal transmitted, via the aforementioned switch circuit, to the antenna.

During the practical application, the first control signal includes a first closing signal and a first opening signal; the second control signal includes a second closing signal and a second opening signal, and correspondingly, the applying the first control signal to the target switch branch and applying the second control signal to the other switch branches, includes:

applying the first closing signal to a first switch and a third switch corresponding to the target switch branch and applying the first opening signal to a second switch corresponding to the target switch branch; the first closing signal is configured to instruct the first switch and the third switch corresponding to the target switch branch to be closed; and the first opening signal is configured to instruct the second switch corresponding to the target switch branch to be opened; and applying the second opening signal to a first switch and a third switch corresponding to each of the other switch branches, and applying the second closing signal to a second switch corresponding to each of the other switch branches; the second closing signal is configured to instruct the second switch corresponding to each of the other switch branches to be closed; and the second opening signal is configured to instruct the first switch and the third switch corresponding to each of the other switch branches to be opened.

It should be noted that the first closing signal and the second closing signal may be the aforementioned first control voltage applied to the switches or the aforementioned second control voltage applied to the switches, and the specific signal to be used may be selected according to the types of switches adopted. The first opening signal or the second opening signal may be a signal for stopping applying the first control voltage to each of the aforementioned switches or stopping applying the second control voltage to each of the aforementioned switches. The control method is of the same inventive concept as the aforementioned switch circuit, and the aforementioned switch circuit may be controlled by the control method, thus providing good isolation between different types of wireless communication services in a wireless communication device adopting such switch circuit. The meanings of the terms appeared here have been explained above and will not be repeated here.

Figure 5:
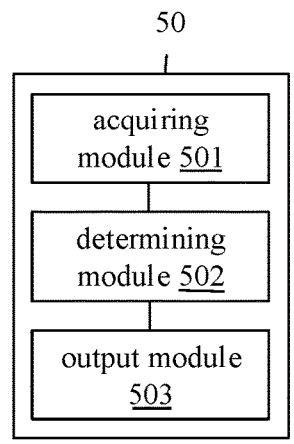
FIG. 5 is a schematic structural diagram of a control device provided by an embodiment of the disclosure.

Based on the above descriptions, an embodiment of the disclosure further provides a control device, as illustrated in FIG. 5, which illustrates a schematic structural diagram of a control device provided by an embodiment of the disclosure. The device 50 includes: an acquiring module 501, a determining module 502 and an output module 503, herein:

the acquiring module 501 is configured to acquire a first radio frequency signal;

the determining module 502 is configured to determine, based on the first radio frequency signal, a target switch branch and other switch branches of a switch circuit; and the output module 503 is configured to apply a first control signal to the target switch branch and apply a second control signal to the other switch branches; the first control signal is configured to instruct transmission of the first radio frequency signal in the target switch branch; the target switch branch is determined, by a wireless communication device, from multiple switch branches of the switch circuit based on the first radio frequency signal; the second control signal is configured to instruct transmission of a second radio frequency signal in each of the other switch branches; and the second radio frequency signal is generated based on the first radio frequency signal transmitted.

In some embodiments, the output module 503 is specifically configured as follow: the first control signal includes a first closing signal and a first opening signal; the second control signal includes a second closing signal and a second opening signal, and correspondingly, applying the first control signal to the target switch branch and applying the second control signal to the other switch branches, applying the first closing signal to a first switch and a third switch corresponding to the target switch branch and applying the first opening signal to a second switch corresponding to the target switch branch; the first closing signal is configured to instruct the first switch and the third switch corresponding to the target switch branch to be closed; the first opening signal is configured to instruct the second switch corresponding to the target switch branch to be opened; applying the second opening signal to a first switch and a third switch corresponding to each of the other switch branches, and applying the second closing signal to a second switch corresponding to each of the other switch branches; the second closing signal is configured to instruct the second switch corresponding to each of the other switch branches to be closed; the second opening signal is configured to instruct the first switch and the third switch corresponding to each of the other switch branches to be opened.

It should be noted that the control device is of the same inventive concept as the aforementioned control method, and the control device is configured to control the aforementioned switch circuit. The meanings of the terms appeared here have been explained above and will not be repeated here.

Figure 6:
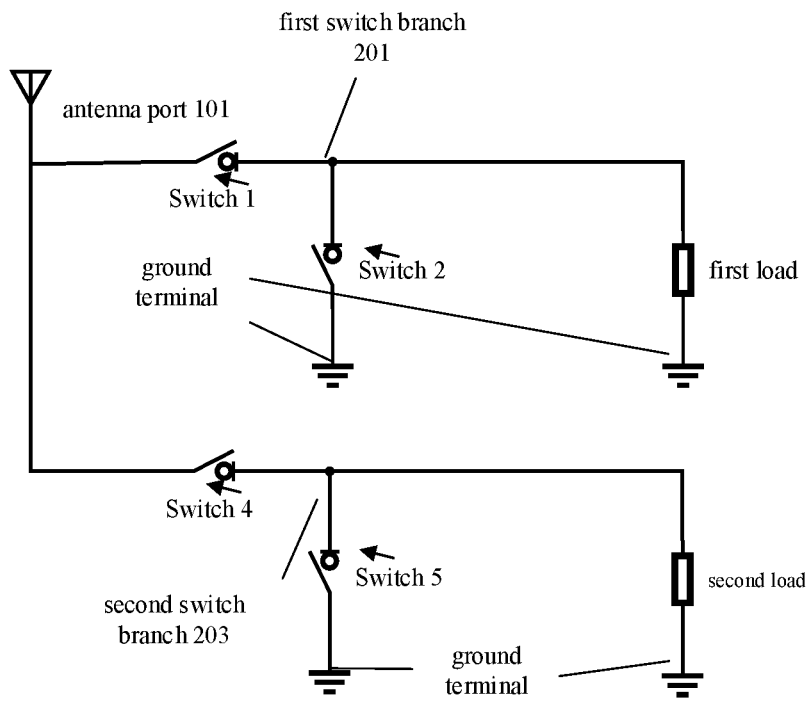
FIG. 6 is a schematic diagram of a topological structure of a single-pole double-throw switch circuit in some embodiments.

The embodiments of the disclosure provide a switch circuit, a control method and a control device, each of switch branches of the switch circuit adopts three switches to form a T-shaped structure, as illustrated in FIG. 2, in this structure, when one of the switch branches of the switch circuit does not transmit a first radio frequency signal, by opening the third switch near the load side, compared with the radio frequency switch circuit illustrated in FIG. 6, the impedance of the switch branch corresponding to the third switch is greatly increased, thereby reducing a second radio frequency signal of the switch branch generated, by electromagnetic induction, based on the first radio frequency signal, and thus reducing the interference voltage applied to the load connected with the switch branch, for example, for the first switch branch in FIGS. 2 and 6, when the first switch branch does not transmit the first radio frequency signal but transmits the second radio frequency signal, the processor of the wireless communication device opens switch 3, so that the second radio frequency signal of the first switch branch generated, by electromagnetic induction, based on the first radio frequency signal is reduced, thus reducing the interference voltage applied to the first load, so that the isolation between the first switch branch and the second switch branch is improved.

Based on the above descriptions, an embodiment of the disclosure further provides a radio frequency switch, including any one of the above switch circuits.

The disclosure provides a computer-readable medium in which a computer program is stored, the computer program implements, when executed by a processor, the steps of the above-described embodiments of the method, and the above-mentioned storage medium includes various medium that may store program codes, such as mobile storage devices, Read-Only Memory (ROM), Random Access Memory (RAM), magnetic disks or optical disks, etc.

An embodiment of the disclosure further provides a control device, including: a processor and a memory configured to store a computer program that is executable on the processor, herein, the processor is configured to implement, when executing the computer program, the steps of the above-described embodiments of the method stored in the memory.

Figure 7:
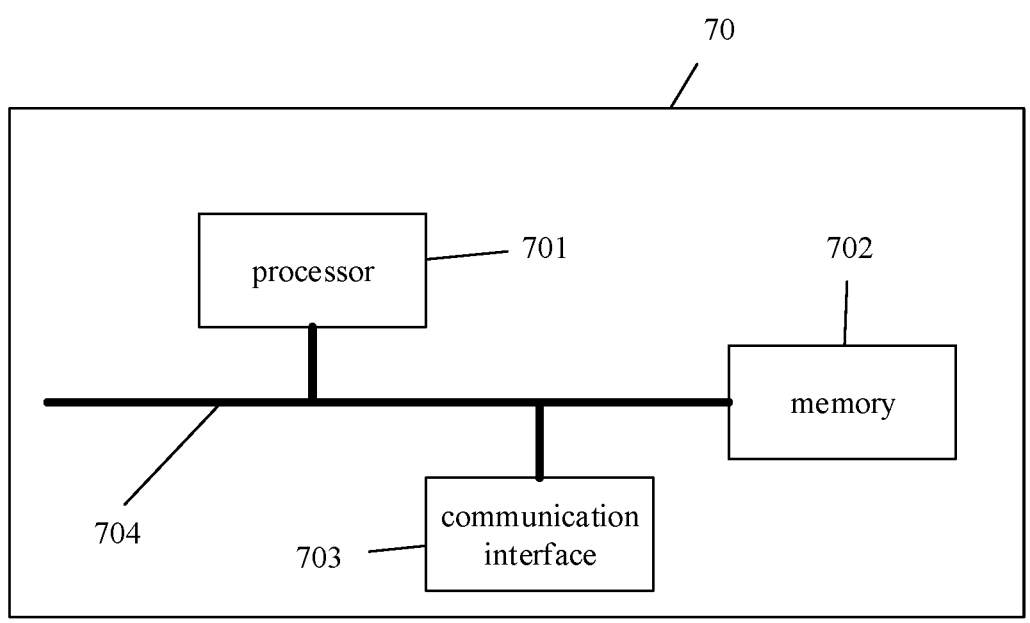
FIG. 7 is a schematic diagram of a hardware structure of a control device provided by an embodiment of the disclosure.

FIG. 7 is a schematic diagram of a hardware structure of a control device of an embodiment of the disclosure, the control device 70 includes at least one processor 701 and a memory 702; in an embodiment, the control device 70 may also include at least one communication interface 703; various components in the control device 70 may be coupled together through a bus system 704, it can be understood that the bus system 704 is configured to realize connection communication between these components. The bus system 704 includes a power bus, a control bus and a status signal bus in addition to a data bus. However, for clarity of illustration, various buses are denoted as the bus system 704 in FIG. 7.

It can be understood that the memory 702 may be a volatile memory or a non-volatile memory, and may also include both volatile and non-volatile memories. The non-volatile memory may be Read Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), flash memory, magnetic surface memory, optical disc, or Compact Disc Read-Only Memory (CD-ROM); the magnetic surface memory may be a disk memory or a tape memory. The volatile memory may be Random Access Memory (RAM), which is used as an external cache. By way of exemplary but not limiting illustration, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM) and Direct Rambus Random Access Memory (DRRAM). The memory 702 described in the embodiments of the disclosure is intended to include, but is not limited to, these memories and any other suitable types of memories.

The memory 702 of the embodiments of the disclosure is configured to store various types of data to support the operation of the control device 70. Examples of such data include: any computer program configured to be operated on the control device 70, such as a computer program determining a target switch branch, etc., and the program implementing the method of the embodiments of the disclosure may be included in the memory 702.

The method disclosed in the above embodiments of the disclosure may be configured in the processor 701 or implemented by the processor 701. The processor 701 may be an integrated circuit chip with signal processing capability. During the implementation, each of the steps of the above method may be completed by an integrated logic circuit of hardware in the processor 701 or instructions in the form of software. The above processor 701 may be a general-purpose processor, a Digital Signal Processor (DSP), or other programmable logic devices, discrete gates or transistor logic devices, discrete hardware components, and the like. The processor 701 may implement or execute various methods, steps, and logic block diagrams disclosed in the embodiments of the disclosure. The general-purpose processor may be a microprocessor or any conventional processor. In conjunction with the steps of the method disclosed in the embodiments of the disclosure, they may be directly embodied as being completed by the hardware decoding processor, or by the combination of hardware and software modules in the decoding processor. The software module may be located in a storage medium, and the storage medium is located in the memory 702, and the processor 701 reads the information in the memory, completes the steps of the aforementioned method in conjunction with the hardware thereof.

In an exemplary embodiment, the control device 70, which is configured to perform the above method, may be implemented by one or more of Application Specific Integrated Circuit (ASIC), DSP, Programmable Logic Device (PLD), Complex Programmable Logic Device (CPLD), Field-Programmable Gate Array (FPGA), general-purpose processor, controller, Micro Controller Unit (MCU), microprocessor, or other electronic components.

In several embodiments provided in the disclosure, it should be understood that the disclosed device and method may be implemented in other ways. The above-mentioned device embodiments are merely illustrative, for example, the division of the units is only a division based on logical functions, and there may be other divisions in actual implementations, e.g., multiple units or components may be combined, or may be integrated in another system, or some features may be ignored, or may not be performed. In addition, the coupling, or direct coupling, or communication connection between the components illustrated or discussed may be indirect coupling or communication connection through some interfaces, devices or units, which may be electrical, mechanical or otherwise.

The above-mentioned units illustrated as separate components may be or may not be physically separated, and the components illustrated as units may be or may not be physical units, i.e., they may be located in one place or distributed to multiple network units; some or all of the units may be selected according to actual needs to achieve the purpose of the solutions of the embodiments.

In addition, each functional unit in each of the embodiments of the disclosure may be all integrated in a processing unit, or each unit may be separately present as a single unit, or two or more units may be integrated in a single unit; the above integrated units may be realized either in the form of hardware or in the form of hardware together with software functional units.

Those ordinarily skilled in the art may understand that all or a part of the steps for realizing the above-mentioned embodiments of the method may be realized by hardware related to program instructions, and the above-mentioned program may be stored in a computer readable storage medium, and when the program is executed, the steps including the above-mentioned embodiments of the method are executed; and the above-mentioned storage medium includes various medium that may store program codes, such as mobile storage devices, Read-Only Memory (ROM), Random Access Memory (RAM), magnetic disks or optical disks, etc.

Or, the above integrated unit in the disclosure may also be stored in a computer-readable storage medium, when it is implemented as a software function module and sold or used as an individual product. Based on such understanding, the technical solutions of the embodiments of the disclosure substantially or the part contributing to the related art may be embodied in the form of a software product, and the computer software product is stored in a storage medium and includes several instructions to allow a computer device (which may be a personal computer, a server, or a network equipment, etc.) to execute all or part of the method described in each of the embodiments of the disclosure. And the aforementioned storage medium includes various medium that may store program codes, such as mobile storage devices, ROM, RAM, magnetic disks or optical disks etc.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

What is claimed is:

1. A switch circuit, comprising:
an antenna port; and
multiple switch branches arranged parallel to each other; wherein
each of the switch branches comprises a first switch, a second switch and a third switch;
a first end of the antenna port is connected with an antenna;
a second end of the antenna port is electrically connected with a third end of the first switch of each of the at switch branches respectively;
a fourth end of the first switch of each of the switch branches is electrically connected with a fifth end of the second switch corresponding to each of the switch branches and a sixth end of the third switch corresponding to each of the switch branches respectively;
a seventh end of the second switch corresponding to each of the switch branches is connected with a ground terminal;
an eighth end of the third switch corresponding to each of the switch branches is electrically connected with a ninth end of a load corresponding to each of the switch branches;
a tenth end of the load is connected with the ground terminal;
a target switch branch of the switch branches is configured to, when the first switch and the third switch corresponding to the target switch branch are closed and the second switch corresponding to the target switch branch is opened, transmit a first radio frequency signal; and
the target switch branch is determined, by a wireless communication device, from the switch branches based on the first radio frequency signal.

2. The switch circuit of claim 1, wherein
non-target switch branches of the switch branches are configured to, when the target switch branch transmits the first radio frequency signal, and the first switches and the third switches corresponding to the non-target switch branches are opened and the second switches corresponding to the non-target switch branches are closed, transmit a second radio frequency signal; and
the second radio frequency signal is generated based on the first radio frequency signal transmitted.

3. A radio frequency switch, comprising the switch circuit of claim 1.

4. A switch circuit, comprising:
an antenna port; and
multiple switch branches arranged parallel to each other; wherein
each of the switch branches comprises a first switch, a second switch and a third switch;
a first end of the antenna port is connected with an antenna;
a second end of the antenna port is electrically connected with a third end of the first switch of each of the switch branches respectively;
a fourth end of the first switch of each of the switch branches is electrically connected with a fifth end of the second switch corresponding to each of the switch branches and a sixth end of the third switch corresponding to each of the switch branches respectively;
a seventh end of the second switch corresponding to each of the switch branches is connected with a ground terminal;
an eighth end of the third switch corresponding to each of the switch branches is electrically connected with a ninth end of a load corresponding to each of the switch branches;

a tenth end of the load is connected with the ground terminal;

the first switch, the second switch and the third switch comprise a plurality of electronic switches; and a number of electronic switches comprised in the first switch or the second switch is greater than another number of electronic switches comprised in the third switch.

5. A wireless communication apparatus comprising a switch circuit comprising:

an antenna port; and multiple switch branches arranged parallel to each other; wherein each of the switch branches comprises a first switch, a second switch and a third switch;

a first end of the antenna port is connected with an antenna;

a second end of the antenna port is electrically connected with a third end of the first switch of each of the switch branches respectively;

a fourth end of the first switch of each of the switch branches is electrically connected with a fifth end of the second switch corresponding to each of the switch branches and a sixth end of the third switch corresponding to each of the switch branches respectively;

a seventh end of the second switch corresponding to each of the switch branches is connected with a ground terminal;

an eighth end of the third switch corresponding to each of the switch branches is electrically connected with a ninth end of a load corresponding to each of the switch branches;

a tenth end of the load is connected with the ground terminal;

the first switch, the second switch and the third switch form a T-shaped structure to thereby facilitate isolation in each of the switch branches;

the first switch, the second switch and the third switch comprise a plurality of electronic switches; and a number of electronic switches comprised in the first switch or the second switch is greater than another number of electronic switches comprised in the third switch.

6. The apparatus of claim 5, wherein a target switch branch of the switch branches is configured to, when the first switch and the third switch corresponding to the target switch branch are closed and the second switch corresponding to the target switch branch is opened, transmit a first radio frequency signal; and the target switch branch is determined, by a wireless communication device, from the switch branches based on the first radio frequency signal.

7. The apparatus of claim 6, wherein non-target switch branches of the switch branches are configured to, when the target switch branch transmits the first radio frequency signal, and the first switches and the third switches corresponding to the non-target switch branches are opened and the second switches corresponding to the other switch branches are closed, transmit a second radio frequency signal; and the second radio frequency signal is generated based on the first radio frequency signal transmitted.

* * * * *